United States Patent
Donker et al.

(10) Patent No.: US 7,194,531 B2
(45) Date of Patent: Mar. 20, 2007

(54) SYSTEM AND METHOD FOR DETERMINING THE AVAILABILITY OF A WEB PAGE

(75) Inventors: Hans Donker, Hellevoetsluis (NL); Edward E. Kelley, Wappingers Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 10/307,955

(22) Filed: Dec. 2, 2002

(65) Prior Publication Data

US 2004/0107267 A1    Jun. 3, 2004

(51) Int. Cl.
*G06F 15/173* (2006.01)
*G06F 15/16* (2006.01)

(52) U.S. Cl. .............. 709/223; 709/224; 709/227
(58) Field of Classification Search ............. 709/223, 709/224, 229, 242
See application file for complete search history.

(56) References Cited

U.S. PATENT DOCUMENTS

| | | | |
|---|---|---|---|
| 5,727,129 A * | 3/1998 | Barrett et al. | 706/10 |
| 5,870,559 A * | 2/1999 | Leshem et al. | 709/224 |
| 5,913,215 A | 6/1999 | Rubinstein et al. | |
| 5,974,445 A * | 10/1999 | Pivnichny et al. | 709/203 |
| 6,035,330 A | 3/2000 | Astiz et al. | |
| 6,185,701 B1 * | 2/2001 | Marullo et al. | 714/38 |
| 6,317,788 B1 | 11/2001 | Richardson | |
| 6,748,550 B2 * | 6/2004 | McBrearty et al. | 714/4 |
| 2003/0078992 A1 * | 4/2003 | Kirkwood et al. | 709/218 |

* cited by examiner

*Primary Examiner*—Abdullah Galad
*Assistant Examiner*—Sargon N. Nano
(74) *Attorney, Agent, or Firm*—DeLio & Peterson, LLC; Kelly M. Nowak; James J. Cioffi (57) ABSTRACT

A process and system that allows a client/server, upon receiving a web page, to invoke a program that reads the page for all links and commences a first ping transaction for each of the links to determine if each link is available. The process and system visually indicate to the client/server an availability status of each of these links so that the client/server can predetermine the success rate with which the client/server will be able to access each of these links, thereby avoiding manually clicking on each of these links to determine a page's availability. As some servers may be unavailable due to server or network issues, the process and system continue testing for any links previously not found. This testing continues until the web page is within "n" number of pages from the web page currently being viewed, whereby the client/server may modify the "n" number of pages.

20 Claims, 3 Drawing Sheets

SYSTEM AND METHOD FOR DETERMINING THE AVAILABILITY OF A WEB PAGE

Related Application

Aspects of the present invention are related to subject matter disclosed in co-pending application Ser. No. 10/307,921, entitled "System and Method For Accessing Content of a Web Page" by the same inventors, filed on even date herewith and assigned to the assignee of the present invention, the disclosure of which is hereby incorporated by reference.

BACKGROUND OF THE INVENTION

1. Field of the Invention

The present invention relates generally to web-browsers, and more particularly, to a web browser that automatically checks availability of hot links on a displayed web page.

2. Description of Related Art

In the course of accessing information by means of a web browser from a network, such as the Internet or a company or office intra-net, a user often finds a web page at a particular URL (Uniform Resource Locator) address that contains information the user would like to access. The web page typically contains several links to a variety of other web pages on its serving equipment or on the serving equipment that presents these other web pages.

Often, a user desires to visit certain ones of these other web pages. In so doing, the user currently must manually move the cursor over and click on the desired link or URL displayed on the viewed web page. However, when a user clicks on these links, the user cannot pre-determine the success rate at which the web browser will be able to retrieve and visually display these desired web pages to the user. After the user has manually clicked on the link to the desired web page, the web browser then tries to retrieve the desired linked web page and visually display this desired web page to the user. In the prior art, the retrieved results of this request by the user would include the user being presented with the desired web page, a "page not found message" from the proxy server, or a long delay or wait period that indicates the web browser is not successfully retrieving the content which resides on the web server that the link refers to and that is to produce the desired web page.

Other known processes and systems for determining the success rate at which a user will be able to link to a desired web page include those that use search requests, such as, searching content on web pages, validating stored bookmarks, and usage of historical data access through a proxy server. However, these processes and systems for determining the success rate at which a user may link to a desired web page are tedious, time consuming, inefficient or are still being dependent on manual input of the user for process initiation.

Accordingly, there is need in the art for a process and system that enables a user to quickly and easily visually pre-determine the success rate at which the user will be able to link to and view a desired web page.

Bearing in mind the problems and deficiencies of the prior art, it is therefore an object of the present invention to provide a process and system that enables a user to quickly and easily visually pre-determine the success rate at which the user will be able to successfully link to and view a desired web page.

It is another object of the present invention to provide a process and system that enables a user to visually pre-determine the availability status of all hot links on a currently viewed web page.

Another object of the present invention is to provide a process and system that enables a user to visually pre-determine the availability status of all hot links that should exist on a particular server complex with a single request rather than a number of requests for each individual hot link as in the prior art.

A further object of the invention is to provide a process and system that enables a user to visually pre-determine the availability status of all hot links on a currently viewed web page resulting in reduced network congestion.

Still another object of the invention is to provide a process and system that enables a user to visually pre-determine the availability status of a hot link(s) which is not dependent on manual input of the user for process initiation.

Still other objects and advantages of the invention will in part be obvious and will in part be apparent from the specification.

SUMMARY OF THE INVENTION

The above and other objects and advantages, which will be apparent to one of skill in the art, are achieved in the present invention, which is directed to, in a first aspect, a process for dynamically checking availability of hyperlinks on a web page. The process includes accessing a first web page having hyperlinks to other web pages, determining an availability status of the hyperlinks to other web pages using a ping transaction and visually indicating the availability status of the hyperlinks to the other web pages on the first web page.

In accordance with the invention, the step of determining the availability status of hyperlinks to other web pages using the ping transaction includes constructing at least a first ping transaction containing an address to a common server and an individual file structure for each of a plurality of the hyperlinks to the other web pages accessible by the common server. The first ping transaction is then sent to the common server to determine the availability status for each of the file structures of the hyperlinks. Subsequently, a return ping transaction is received containing each of the file structures and a status code indicating the availability status of each of the file structures of the hyperlinks. This process may continue for all hyperlinks found on the first web page by determining if each of the hyperlinks exist within at least one of a plurality of ping transactions.

A time delay may be included when the common server is non-responsive. This time delay indicates an expected length of time for accessing the common server that exceeds a predetermined threshold. When the time delay has been exceeded, the ping transaction is resent to the common server to determine the availability status for each of the file structures of the hyperlinks.

The step of visually indicating the availability status of the other web pages on the first web page first includes creating a ping table containing the address to the common server and each of the individual file structures for each of the hyperlinks. Status codes indicating the availability status for each of the file structures of the hyperlinks are then stored in memory, whereby the ping table is continually updated with these status codes. The first web page is refreshed by dynamically indicating the current availability status for each of the hyperlinks to the other web pages using a visual availability indicator.

The visual availability indicators include color indicators, sounds, graphical displays, tables, highlighting, a change of text, underlining and brackets, whereby a plurality of differing current availability statuses are visually displayed on the first web page. For example, the indicators may indicate available hyperlinks, not available hyperlinks and hyperlinks for which a time delay has occurred.

In continually updating the ping table, the process includes accessing the ping table having the hyperlinks to the other web pages referenced by relative numbers within the ping table and continually searching for and locating newer versions of the hyperlinks to the other web pages. Once located, these newer versions of the hyperlinks replace the older versions of the hyperlinks in the ping table by identifying the newer versions as the most recently found hyperlinks by renumbering the relative numbers within the ping table. This prevents duplicative hyperlink listings within the ping table. This hotlink search is dynamically maintained for a predetermined number of web pages away from the first web page. At least one of these newer versions of the hyperlinks to other web pages may comprise a redirected web page.

In another aspect, the invention provides a process for deploying computing infrastructure comprising integrating computer-readable code into a computing system. This code, in combination with the computing system, is capable of performing a process of dynamically checking availability of hyperlinks on a web page by accessing a first web page having hyperlinks to other web pages, determining an availability status of the hyperlinks using a ping transaction and visually indicating the availability status of the other web pages on the first web page.

In yet two other aspects of the invention, the invention provides a system for dynamically checking availability of hyperlinks on a web page and a program storage device readable by a machine, tangibly embodying a program of instructions executable by the machine to perform method steps for a process of dynamically checking availability of hyperlinks on a web page. Both the system and the program storage device perform the steps including accessing a first web page having hyperlinks to other web pages, determining an availability status of the hyperlinks using a ping transaction and visually indicating the availability status of the other web pages on the first web page.

In so doing, the system and program storage device perform the steps of constructing at least a first ping transaction containing an address to a common server and an individual file structure for each of a plurality of the hyperlinks to the other web pages accessible by the common server. This first ping transaction is then sent to the common server to determine the availability status for each of the file structures of the hyperlinks and then a return ping transaction is received containing each of the file structures and a status code indicating the availability status of each hyperlink.

In indicating the availability status of the other web pages on the first web page, the system and program storage device perform the steps including creating a ping table containing the address to the common server and each of the individual file structures for each of the hyperlinks. The status codes indicating the availability statuses are stored in the ping table, which is continually updated with current availability statuses for each of the hyperlinks. The system and program storage device then perform the steps of dynamically refreshing the first web page with these updated availability statuses.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–3 of the drawings in which like numerals refer to like features of the invention. Features of the invention are not necessarily shown to scale in the drawings.

The present invention solves the problems in the art by avoiding the time consuming, tedious and inefficient tasks of determining web page availability status by allowing a user to easily determine whether a desired web page is available by merely viewing the URL address of such web page on a currently viewed web page. Preferably, the availability status of the web page is viewed by a mouse-over of the URL address, whereby a visual indicator signifies to the user the availability status of such web page. The invention advantageously avoids the need for the user to manually click on a link to a desired web page to determine its availability status, as well as avoids having to search for content relating to a search request on a given web page. It enables the user to quickly and easily pre-determine the success rate at which a web browser will be able to retrieve and visually display a desired web page by rapidly checking only for the availability status of a desired web page using a "lightweight protocol."

Definitions relevant to the present invention are as follows:

Lightweight protocol: A protocol is an agreed-upon format for transmitting data between two devices. The lightweight protocol has smaller amount of code.

IP address: The Internet Protocol (IP) is the method or protocol by which data is sent from one computer to another on the Internet. Each computer on the Internet has at least one IP address that uniquely identifies it from all other computers on the Internet.

Ping: A traditional ping is a utility to determine whether a specific IP address is accessible. The instant invention adds further functionality to that of a traditional ping by providing an improved ping (the "sent ping") with the added ability of validating or determining if the file structure is available at a specific IP address. The instant "sent ping" also has the ability to validate multiple file structures on a common server in a single transaction.

Return Ping: The return ping includes the URL address, the file structure of such address and an availability indicator that indicates whether or not such URL is available.

Ping Table: This table stores the results of the return ping transactions, i.e., the returned ping, sent from the server and the database. The ping table includes the stored returned ping transaction information indicating the availability status of the desired URL. It is used to refresh or update the viewed web page to indicate the availability status of all URLs on the web page using this stored data, as well as to determine which links are not found and continue searching for those not found links.

URL (Uniform Resource Locator): An Internet address (for example, http://www.hmco.com/trade/), that indicates the server protocol to use in accessing the resource (http), the domain name of the server (www.hmco.com), and the name and location of the resource on that particular server (trade).

Web Page: A block of data available on the World Wide Web, identified by a URL. A web page is stored on a server and is a file written in HTML and any related files for scripts and graphics. It is often hyperlinked to other documents on the Web.

Hot Link: A URL on a web page.

HTML: Hypertext Markup Language.

Server: A computer or device on a network that manages network resources.

Web browser: A software application used to locate and display web pages.

In particular, the invention relates to a web browser that automatically and dynamically checks availability of hot links on a displayed web page whereby the web page is automatically updated with the availability status of such hot links and re-direction information before and during the display of the web page. The invention provides a lightweight protocol implemented between web page serving systems such as, for example, sent and returned ping transactions. The lightweight protocol enables a first web server to send a short request to present a web page, preferably via a sent ping, to a second web page serving system therein asking the second web page serving system if the web page is available. In accordance with the invention, the web page serving system then responds, preferably via a return ping, "yes" if the web page is found or available, or "no" if the web page is not found or unavailable. If the web page is not found or unavailable, a predetermined time out occurs, and once expired, the lightweight protocol rechecks the availability status of such web page by resending the short request to present the web page to the second web page serving system to determine its availability status. Once the web page is found, a status indicator is recorded in a ping table. The ping table containing such recorded data continuously refreshes the viewed web page to visually indicate the availability status of each URL on the page, as well as determines which links are not found, or are unavailable, and continues searching for those unfound links.

The invention enables a user to visually pre-determine the availability status of all hot links, i.e., the success rate at which the user will link to the web pages, that should exist on a particular server complex with a single request rather than a number of requests for each individual hot link as is currently done in the prior art. This may be accomplished by sending multiple HTML "file structures" requests on one HTML ping. That is, all of the URLs that exist on a common server are sent in one transaction that includes all of the HTML "file structures" that are common to that server.

In accordance with the invention, wherein a web page is not available and a predetermined time out occurs, the user can selectively request that the desired web page be retrieved only when the system holding such web page becomes available. The storing of this request can be done locally on the client computer, on the web server or on a proxy server. Optionally, a retry period and/or a retry counter may be associated with this request.

After each of the links on the web page have been checked for availability status, the instant process and system provide a visual availability indicator to each of these processed links to visually indicate to the user the respective availability status of each link. These visual availability indicators may include, but are not limited to, color indicators, sounds and graphical displays such as tables, highlighting, a change of text, underlining, brackets and the like. These visual indicators may be added as a tag to the URL. Preferably, these visually displayed indicators on the web page inform the user that those URLs having the visual availability indicators associated therewith are available, not available or a time out has occurred because the link is not found. For example, the invention may simultaneously color code those links that would have a high potential of being successfully accessed in a first color (the returned ping would have returned YES), those links having no potential of being accessed in a second color (the returned ping would have returned NO) and those links for which a time out occurred in a third color (the returned ping would have returned TIMEOUT). As some servers may be temporarily unavailable due to server or network issues, the invention continues checking the availability status for any links previously not found.

The instant invention will be better understood in accordance with the description of the invention as described in detail below with reference to FIGS. 1–3.

Figure 1:
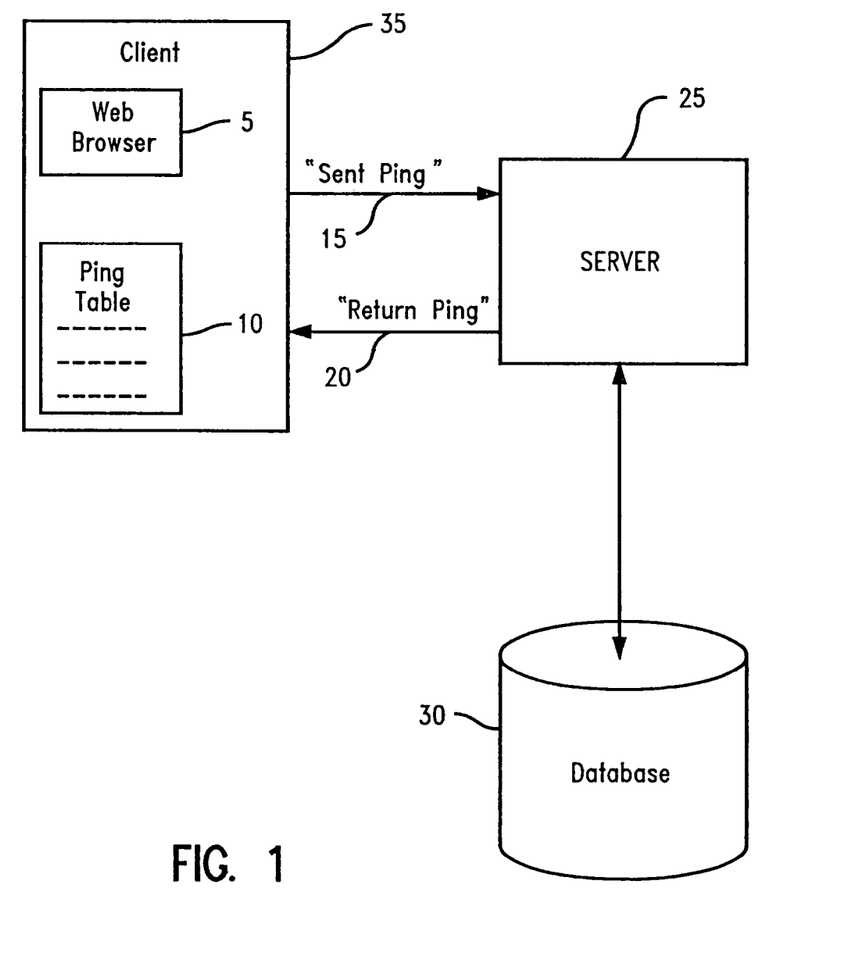
FIG. 1 illustrates a block diagram of a network on which the present invention operates.

The instant invention may operate on a network as illustrated in FIG. 1. As shown, the network may include a client computer 35, a server 25 and networking communications lines 15, 20. The server 25 manages a database 30 of web pages containing file structures of such web pages, whereby a variety of other known "intermediary" servers (not shown) may also exist between the client computer and the server for purposes such as gateways and proxy servers. The client computer 35 includes a web-browser 5 and a ping table 10. As shown, the web-browser 5 communicates with server 25 via a sent ping 15. Alternatively, the invention may be performed from web server to web server, i.e., sending the sent ping 15 from one server to another server. The sending server/web-browser may simultaneously send out multiple pings, one for each link that is in the web page to be retrieved.

The instant sent ping 15 includes the protocol identifier indicating that the message is a http ping protocol, the address of the sending client or server, the name of the web server to be reached and the file structure that points to the desired web page. Unlike conventional pings which only communicate with the server, the instant sent ping 15 communicates with the server 25 and the database 30 containing file structures to validate the existence of each of the file structures of a URL for a desired web page, therein determining if such web page exists within such database. In so doing, the destination web server recognizes the http ping command and attempts to locate the web page sent as part of this transaction within the database 30. The web server 25 gathers this information and sends it back to the client computer 35 via the return ping 20. The return ping 20 contains the same information as the sent ping, i.e., the URL address and/or IP name of the web server and the file structure, in addition to the status code(s) of each desired web page indicating the pages' availability status, i.e., indicating whether the page is found/available or not found/unavailable. The status code is next to the file structure for each web page. The originating server/client 35 reads this information and stores it in the structured ping table 10, therein updating the ping table 10 with the IP address of the web server, the requested file structure and indicator for found or not found. The availability status of each of the hotlinks on a viewed web page are then visually indicated to the user via the information store in the ping table while the invention continually search for those pages not found within the ping table. While the user is viewing the web page, the invention updates the ping table and refreshes the web page with the contents of the updated ping table.

The key to the ping table record is the link address of the web page that is being examined for available links. The invention continues to check all links on the web page while the web page is within "n" number of pages from the currently viewed web page, whereby the user may modify the "n" number of pages. In accordance with the invention, if the web page is within "n" pages of the current page, the web page will be updated with the information contained in the ping table before it is displayed, or if the web page is being viewed, it is refreshed to indicate the availability status of all links on such page. Wherein the instant process and system is aimed at detecting only the availability status of those links that are unavailable, the ping table is updated with those links that are available or have been found and then such links are not rechecked for availability status. For example, a string may be received such as "HTTP ping answer: item1: found;item2found;item3: notfound;item4: relocated to http:// . . . ".

Figure 2:
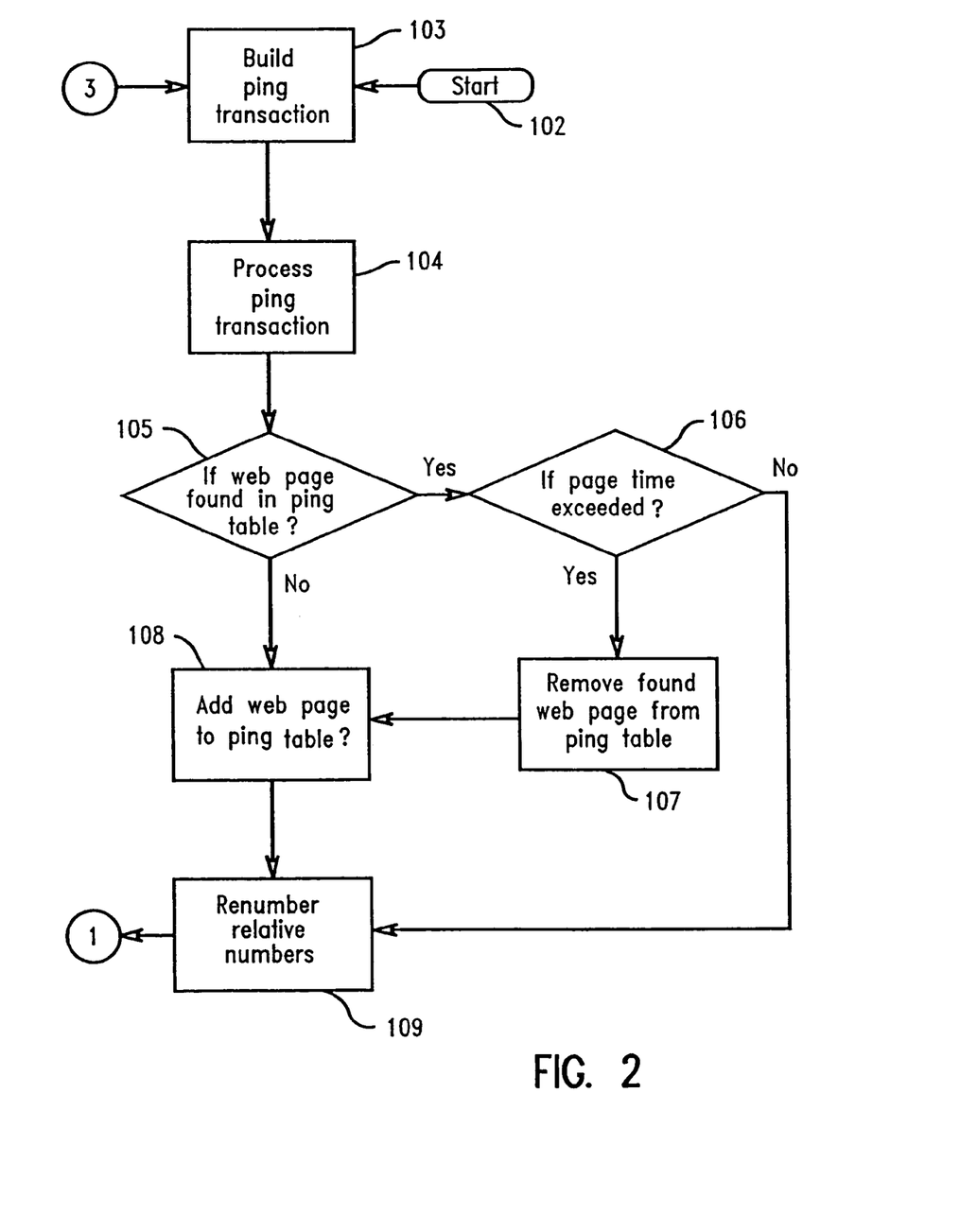
FIG. 2 illustrates the process flow of the preferred embodiment of the invention for checking the availability status of a desired web page using a ping transaction table.
Figure 3:
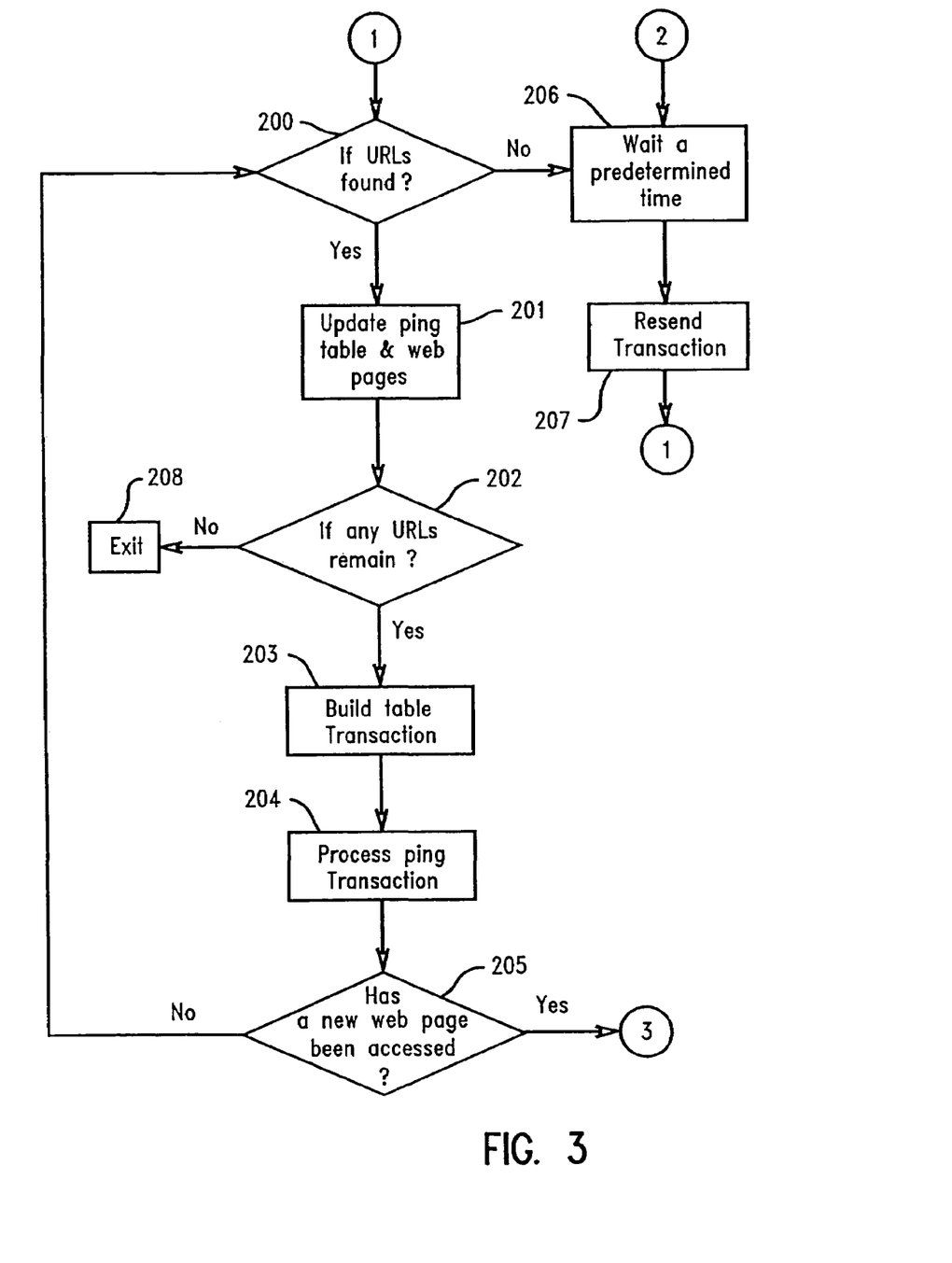
FIG. 3 illustrates that the process flow of FIG. 2 continues to check the availability status for all URLs on an accessed web page, as well as for all newly accessed web pages.

Flow charts for the preferred embodiment are shown in FIGS. 2 and 3. Numerals in circles indicate connections to like numerals in other parts of the flow charts and figures. These figures describe the operations of the preferred embodiment on the client computer 35 running the web browser 5. The flow charts of FIGS. 2 and 3 are described more fully below.

Referring to FIGS. 2 and 3, step 102 indicates that the process is initiated when the user selects a URL to display. Once started, a ping transaction is then built in step 103 by reading the current web page and finding and extracting all of the URLs. A ping transaction is constructed for each of the found URLs. In so doing, there will be one ping transaction for each of the servers referenced on the web page whereby each ping transaction contains the information to determine the availability of multiple URLs. This is accomplished by including within a ping transaction an address for a common server, the individual file structures for each of the URLs that are accessible by the common server and an instruction informing the server that the incoming data is a ping. This completed ping transaction is then sent to the server, i.e., it is the "sent ping" 15.

In step 104, each individual constructed ping transaction is then processed by each of the servers. The servers check within a database to see if the web pages referenced by the ping transaction are currently available. The server gathers this information and sends it back to the client in the form of a "return ping" 20 transaction. If the server is not available, a time out is allotted for a specified time period. This returned ping transaction includes the identical information contained in the initially sent ping transaction in addition to an indicator noting the availability of each of the web pages listed in the ping transaction, a status code for missing URLs and redirection URLs for those URLs that have changed and are known to the server. The client computer then processes the returned ping 20. The client computer also stores a time delay between the sent ping transaction and the return ping transaction. The time delay is used to display a graphics clock that indicates the expected length of time for accessing a given URL that exceeds a given threshold. A date time stamp is also stored in the client computer to perform a time check. The time check is a wait time that causes a web page's URLs to be rechecked when the time indicated by the time check is exceeded. The client has the ability to alter this wait time by a utility program that is invoked by the invention with a parameter indicating the time check.

It is next determined if the web page is found in ping table 10 in step 105. In so doing, the user decides how many web pages to check for URL addresses availability. This number choice is called the "availability number." The availability number includes the web page that the user has accessed and is being maintained with a color-coded or graphical indicator that indicates the availability of the URLs on the web page. In step 105, it is determined whether the requested web page is listed in the ping table as one of the web pages that is referenced by the "availability number." If no, the process flow skips to step 108. If yes, the process flow continues to step 106.

In step 106, it is determined if the page time has been exceeded. That is, whether the wait time for rechecking the web page's URLs indicated by the time check has been exceeded. If it has not, then the process flow proceeds to renumbering the relative numbers in step 109. If the page time has been exceeded, then the process flow proceeds to removing the found web page from the ping table in step 107 and subsequently adding the more recently accessed, newer version of the web page to the ping table in step 108 and renumbering the relative numbers in step 109.

In removing the found web page in step 107, such found web page is removed from the ping table by accessing the ping table, locating the reference to the web page and removing the entire row associated with such web page. In accordance with the invention, a web page found in the ping table indicates that such web page was previously accessed and all of its URLs previously checked for availability. However, as the found web page may have changed, or the availability of its URLs may have changed, the entry of the found web page must be removed from the ping table thereby enabling the ping table to continue searching for requested web pages that are not listed as web pages referenced by an availability number.

As discussed above, references of found web pages are added to the ping table in step 108 and then the relative numbers within the ping table are renumbered in step 109. In so doing, after the reference of the web page has been added to the ping table, all other web pages listed within the ping table are renumbered in decreasing fashion to one less than the availability number previously associated with each corresponding web page. Renumbering all the web pages keeps track of the available web pages while the user searches the availability of other web pages. For example, if the availability number is 3, and the user has consecutively linked to 10 web pages, the ping transactions of the invention will be maintained within 3 web pages of the user's current position. If the user advances to another web page, the last web page is dropped from the ping table and only the most recently accessed web pages remain within the ping table. For any URLs not found, pinging is continually occurring and ping table 10 keeps track of the found URLs.

The series of tables below provide examples of the instant process flow steps of determining if the web page is found in the ping table (step 105). If it is not found, such web page is added to the ping table (step 108). If the web page is found and the time check has been exceeded, the web page found in the ping table is removed there-from (step 107), the newer version of the web page added to the ping table (step 108) and the relative numbers renumbered (step 109). If the web page is found in the ping table and the time check has been not exceeded, the relative numbers are renumbered (step 109).

Ping Table 1 below, case 1, shows the results of looking at several web pages, each containing several URLs. Since a user may look at many web pages during an Internet session, the instant invention allows the user to check the availability of all desired URLs indicated on each of the web pages simultaneously. Case 1 illustrates an availability number of 4, or processing the availability of 4 web pages that are identified in the ping table with relative numbers 0 to –3. The web pages are processed sequentially in the following order: www.test1.com; www.test2. com; www.test3. com and www.test4. com. The "Relative Number" column is used to keep track of the web pages that are being maintained with indicators for web page availability whereby the most recent web page accessed has the relative number 0 and the oldest accessed web page has the relative number −3. The ping tables are updated by listing all of the URL addresses for the web page and whether or not each URL address is available with a status indicator "c". As shown in Ping Table 1, the columns for URL 1, 2 and "n" all show the status indicator "c" for the web page www.test2. com, thus indicating that such web page is available.

Ping Table 2 below, case 2, shows the effect of accessing an additional web page www.test5. com. As shown, the "availability number" remains 4, however, accessing the new, additional web page www.test5. com causes all the relative numbers associated with the web pages to change and the relative number of www.test1. com to no longer exist.

Ping Table 3 below, case 3, illustrates the modifications to the ping table when the next web page to be accessed has recently been accessed. In so doing, the relative number dictates that there would be a duplicate web page in the list of web pages contained within the availability number. As shown below, the latest accessed web page is www.test3.com, however as illustrated in Table 2 above, it has recently been accessed. As a result of the availability number being 4, www.test3.com would appear twice in Ping Table 3 in case 3 below. The invention prevents duplicative web pages in the ping tables by scanning the ping table to determine if the web page would be a duplicative listing. If so, the older version, i.e., the web page listed in the ping table associated with a relative number, is removed from the ping table and the most recently accessed version of the web page is added to the ping table with a relative number of zero.

Ping Table 1
Case 1

| Web page URL | Date/Time yyyymmdd/hhmmss | Relative No. | Time Delay (sec.) | URL address 1, or redirection pointer, and URL status code | URL address 2, or redirection pointer, and URL status code | URL address n, or redirection pointer, and URL status code |
|---|---|---|---|---|---|---|
| www.test1.com | 20020312/112915 | −3 | 200 | www.t1.com/f1 c | www.t1.com/f2 | www.t1.com/fn c |
| www.test2.com | 20020312/113018 | −2 | 15 | www.t2.com/f1 c | www.t2.com/f2 c | www.t2.com/fn c |
| www.test3.com | 20020312/113026 | −1 | 1000 | www.t3.com/f1 c | www.t3.com/f2 | www.t3.com/fn |
| www.test4.com | 20020312/113310 | 0 | 10 | www.t4.com/f1 c | www.t4.com/f2 c | www.t4.com/fn |

Ping Table 2
Case 2

| Web page URL | Date/Time yyyymmdd/hhmmss | Relative No. | Time Delay (sec.) | URL address 1, or redirection pointer, and URL status code | URL address 2, or redirection pointer, and URL status code | URL address n, or redirection pointer, and URL status code |
|---|---|---|---|---|---|---|
| www.test1.com | 20020312/112915 | | 200 | www.t1.com/f1 c | www.t1.com/f2 | www.t1.com/fn c |
| www.test2.com | 20020312/113018 | −3 | 15 | www.t2.com/f1 c | www.t2.com/f2 c | www.t2.com/fn c |
| www.test3.com | 20020312/113026 | −2 | 1000 | www.t3.com/f1 c | www.t3.com/f2 c | www.t3.com/ fn c |
| www.test4.com | 20020312/113310 | −1 | 10 | www.t4.com/f1 c | www.t4.com/f2 c | www.t4.com/fn |
| www.test5.com | 20020312/113423 | 0 | 21 | www.t5.com/f1 c | www.t5.com/f2 c | www.t5.com/fn |

Ping Table 3
Case 3

| Web page URL | Date/Time yyyymmdd/hhmmss | Relative No. | Time Delay (sec.) | URL address 1, or redirection pointer, and URL status code | URL address 2, or redirection pointer, and URL status code | URL address n, or redirection pointer, and URL status code |
|---|---|---|---|---|---|---|
| www.test1.com | 20020312/112915 | | 200 | www.t1.com/f1 c | www.t1.com/f2 | www.t1.com/fn c |
| www.test2.com | 20020312/113018 | −3 | 15 | www.t2.com/f1 c | www.t2.com/f2 c | www.t2.com/fn c |
| www.test4.com | 20020312/113310 | −2 | 10 | www.t4.com/f1 c | www.t4.com/f2 c | www.t4.com/ fn c |
| www.test5.com | 20020312/113423 | −1 | 21 | www.t5.com/f1 c | www.t5.com/f2 c | www.t5.com/fn |
| www.test3.com | 20020312/113526 | 0 | 1000 | www.t3.com/f1 c | www.t3.com/f2 c | www.t3.com/fn c |

Ping Table 4 below, case 4, is similar to case 1 as described above, however, it includes the addition of a redirected web page URL. As shown, the web page URL www.test9.com/f1 is a redirection pointer as indicated by redirection status code 301. A redirected page occurs when a URL listed on a web page no longer links to the correct web address. Rather, a new, redirected URL links to the correct URL address. As shown in table 4, the time of the redirected URL (20020312/113455) reflects the time when the redirected URL was updated in the ping table. As shown, in case 4, the redirected URL was updated at a later time than the URL with the relative number 0 (www.test4.com).

availability indicator to visually indicate to the user the availability of each URL on the web page. For example, those links that are available may be color-coded in a first color while those links not available may be color-coded in a different second color. The web pages are updated with mouse-overs whereby as the mouse moves the cursor over a URL having a status code in the ping table, the availability indicator of such URL is visually displayed to the user while the ping table is simultaneously rebuilt in accordance with the invention and any redirected URL's are rewritten to the web page.

Ping Table 4
Case 4

| Web page URL | Date/Time yyyymmdd/hhmmss | Relative No. | Time Delay (sec.) | URL address 1, or redirection pointer, and URL status code | URL address 2, or redirection pointer, and URL status code | URL address n, or redirection pointer, and URL status code |
|---|---|---|---|---|---|---|
| www.test1.com | 20020312/112915 | −3 | 200 | www.t1.com/f1 c | www.t1.com/f2 | www.t1.com/fn c |
| www.test2.com | 20020312/113018 | −2 | 15 | www.t2.com/f1 c | www.t2.com/f2 c | www.t2.com/fn c |
| www.test9.com | 20020312/113455 | −1 | 225 | www.t9.com/f1 c301 | www.t9.com/f2 c | www.t9.com/ fn |
| www.test4.com | 20020312/113310 | 0 | 10 | www.t4.com/f1 c | www.t4.com/f2 c | www.t4.com/fn |

Referring to FIG. 3, the above process flow continues for all URLs found on an accessed web page, or for any URLs on a newly accessed web page, by determining in step 200 if such URL is found in the ping transaction. That is, for each URL on an accessed web page, the instant invention scans the ping transaction to determine whether each URL is in the ping transaction. If the URL is found, then the process flow continues updating the ping table and web pages in step 201. If the URL is not found, the process waits a predetermined amount of time (step 206), resends the sent ping transaction (step 207) and rescans the ping table to determine if the URL is in such ping table (step 200).

In step 201, the ping table and web pages are then updated. In so doing, the ping table is updated with all URL address availability and found indicators for each web page in the ping table that has a listed relative number. The currently viewed web page is also updated with a visual The invention continues for all URLs. In step 202, it is determined if any URLs remain, i.e., if there are any other URL addresses that have not been located in the ping table. If there are no remaining URLs, the process flow stops (step 208). If some URLs do remain, the process flow continues by building ping transactions (step 203). It is also determined in step 202 whether the time check has been exceeded when compared to the date time stamp, as described more fully above in relation to steps 104, 105 and 106.

In step 203, current ping tables are read and then ping transactions are constructed for all URLs not found in the current ping tables. In the invention, one ping transaction exists for each server referenced in the URL address in the ping table whereby each ping transaction contains the information to determine the availability of multiple URL addresses. This is accomplished by including within a ping transaction an address for a common server and the individual file structures for each of the URLs that are accessible by the common server.

The ping transactions are processed in step 204 by sending each individual ping transaction sent to each of the servers, and then the servers check to see if the URL addresses referenced by the ping transaction are currently available. This information is returned to the client as a return ping transaction that is processed by the client and stored in the ping table. The returned ping transaction includes the identical information contained in the initially sent ping transaction in addition to an indicator noting the availability of each of the web pages listed in the ping transaction.

In step 205, it is determined whether a new web page has been accessed. If a user has accessed a new web page, then the process flow continues by building a ping transaction as described in step 103. If the user has not accessed a new web page, the process flow continues to check for URL availability as described in step 200.

If it is determined in step 200 that a URL is not found within the ping table, the process flow goes into a wait state in step 206, for a predetermined time, so as not to flood the network with transactions. The user of the invention has the ability to alter this wait time by a simple utility provided as part of the invention. The utility program is invoked with a parameter indicating the predetermined wait time. After the wait time has expired, each unfound URL address is resent to the server in step 207 to determine if such URL can be found in the ping table in step 200. Once it is determined that no URLs remain to check for availability (step 202), the process flow of the invention stops and the system is exited in step 208.

The invention may be used to select only the subset of the hot links displayed in a currently viewed web page that have not been found to check this subset for availability status. Further in accordance with the invention, if the user selects and clicks on one of the hot links on the displayed web page during automatic testing of the hot links on the page by the web browser, the user's selection preempts the automatic testing of such hot links. The web browser halts this automatic testing of the hot links to immediately respond to the user's selection by retrieving the newly requested link from the appropriate server and loads this newly requested web page for visual display at the client computer. The instant process and system starts again in step 102 by the web browser beginning automatic testing of the hot links for this newly accessed and viewed web page.

In a further aspect, the invention provides a computer-readable code. The computer-readable code may be deployed into the computer system by sending it to a central server, or group of center servers, and then downloading it into the client computers that require the invention. Alternatively, the computer-readable code may be either detached to a directory or loaded into a directory by a button on an e-mail that executes a program for detaching the computer-readable code into such directory. Still another alternative is to send the computer-readable code directly to a directory on the client computer hard drive.

Advantageously, the instant invention provides a function that allows the searches for the availability of hot links, a given number of web pages from the current web page, to cease. As the user traverses forward and backward along the search path, the invention dynamically maintains the hot link search for a user selected number "n" of pages from the current web page. By maintaining the hot link search for a user selected number "n" of pages from the current web page, the invention is an improvement over the prior art which continually searches the availability of hot links to all web pages that have been retrieved, even though many of these web pages will never be accessed again by the user during the current session. The conventional, continual searching of availability of all hot links is inefficient as it wastes CPU cycles, and creates excess and unnecessary network traffic.

The instant invention is also an improvement over the prior art as the invention checks the availability status of hyperlinks on a web page by providing a transaction that includes several hot links in a single transaction. The prior art searches for each hot link with its own independent transaction from the client's browser to a server for each of the hot links, thus also wasting CPU cycles and creating unnecessary network traffic. The invention further provides a function that changes the color of the hyperlink on the web page to indicate that such web page is unavailable, rather than merely changing the color of links to only indicate that such links have been recently accessed.

Another advantage of the invention is that it improves the ease and friendliness of web browsing to a user by allowing such user to easily determine whether a link on a web page is available, preferably, by simply performing a mouse-over of such link whereby a visual availability indicator indicates to the that such link is or is not available. This invention saves the user time, makes web browsing easier, enhances user productivity, avoids potential user irritation and improves user web experience.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,

What is claimed is:

1. A process for dynamically checking availability of hyperlinks on a web page comprising the steps of:
  accessing a first web page having hyperlinks to other web pages;
  compiling a single ping transaction containing file structures for all said hyperlinks to other web pages;
  determining an availability status of all said hyperlinks to other web pages in a single request using said single ping transaction comprising,
    constructing a first single ping transaction containing an address to a common server and an individual file structure for each of a plurality of said hyperlinks to the other web pages accessible by said common server,
    sending said first single ping transaction to said common server to determine said availability status for each of said file structures of said hyperlinks,
    receiving a return ping transaction containing each of said file structures and a status code indicating said availability status of each of said file structures of the hyperlinks; and
  visually indicating said availability status of said hyperlinks to the other web pages on said first web page comprising,
    creating a ping table containing said address to said common server and each of said individual file structures for each of said hyperlinks, storing said status codes indicating said availability status for each of said file structures of the hyperlinks in said ping table, continually updating said ping table with said status codes indicating a current availability status for each of said hyperlinks, and refreshing said first web page by dynamically indicating said current availability status for each of said hyperlinks to the other web pages using a visual availability indicator.

2. The process of claim 1 wherein said process steps continue for all hyperlinks found on said first web page by constructing at least a second single ping transaction containing a second address to a second common server and individual file structures for others of said hyperlinks to the other web pages accessible by said second common server.

3. The process of claim 1 further including a time delay for a predetermined amount of time when said common server is non-responsive, said time delay indicating an expected length of time for accessing said common server that exceeds a predetermined threshold.

4. The process of claim 3 wherein said time delay has exceeded said predetermined threshold further including the step of resending said ping transaction to said common server to determine said availability status for each of said file structures of the hyperlinks.

5. The process of claim 1 wherein said visual availability indicator comprises a display selected from the group consisting of color indicators, sounds, graphical displays, tables, highlighting, a change of text, underlining and brackets.

6. The process of claim 1 wherein a plurality of differing current availability status for said hyperlinks to the other web pages are simultaneously visually indicated on said first web page using a variety of differing visual availability indicators.

7. The process of claim 6 wherein said variety of differing visual availability indicators simultaneously indicate those hyperlinks to other web pages that are available, those hyperlinks to other web pages that are not available and those hyperlinks to other web pages for which a time delay has occurred.

8. The process of claim 1 wherein the step of continually updating said ping table with said status codes indicating said current availability status for each of said hyperlinks comprises:

accessing said ping table having said hyperlinks to the other web pages referenced by relative numbers within said ping table;

continually searching for and locating newer versions of said hyperlinks to the other web pages;

replacing said hyperlinks to the other web pages with said newer versions of said hyperlinks; and identifying said newer versions of said hyperlinks as the currently found hyperlinks to the other web pages by renumbering said relative numbers within said ping table, thereby preventing duplicative hyperlink listings within said ping table.

9. The process of claim 8 further including dynamically maintaining said hotlink search for a predetermined number of web pages away from said first web page.

10. The process of claim 8 wherein at least one of said newer versions of said hyperlinks to other web pages comprises a redirected web page.

11. A system for dynamically checking availability of hyperlinks on a web page, the system to perform the steps of:

accessing a first web page having hyperlinks to other web pages;

compiling a single ping transaction containing file structures for all said hyperlinks to other web pages;

determining an availability status of all the hyperlinks to the other web pages in a single request using said single ping transaction comprising the steps of, constructing a first single ping transaction containing an address to a common server and an individual file structure for each of a plurality of said hyperlinks to the other web pages accessible by said common server;

sending said first single ping transaction to said common server to determine said availability status for each of said file structures of said hyperlinks; and receiving a return ping transaction containing each of said file structures and a status code indicating said availability status of each of said file structures of the hyperlinks; and visually indicating the availability status of the other web pages on the first web page comprising the steps of, creating a ping table containing said address to said common server and each of said individual file structures for each of said hyperlinks;

storing said status codes indicating said availability status for each of said file structures of the hyperlinks in said ping table;

continually updating said ping table with said status codes indicating a current availability status for each of said hyperlinks, and refreshing said first web page by dynamically indicating said current availability status for each of said hyperlinks to the other web pages using a visual availability indicator.

12. The system of claim 11 wherein the step of continually updating said ping table with said status codes indicating said current availability status for each of said hyperlinks, the system to further perform the steps of:

accessing said ping table having said hyperlinks to the other web pages referenced by relative numbers within said ping table;

continually searching for and locating newer versions of said hyperlinks to the other web pages;

replacing said hyperlinks to the other web pages with said newer versions of said hyperlinks; and identifying said newer versions of said hyperlinks as the currently found hyperlinks to the other web pages by renumbering said relative numbers within said ping table, thereby preventing duplicative hyperlink listings within said ping table.

13. The system of claim 11 wherein said process steps continue for all hyperlinks found on said first web page by constructing at least a second single ping transaction containing a second address to a second common server and individual file structures for others of said hyperlinks to the other web pages accessible by said second common server.

14. The system of claim 11 further to perform the step of including a time delay for a predetermined amount of time when said common server is non-responsive, said time delay indicating an expected length of time for accessing said common server that exceeds a predetermined threshold.

15. The system of claim 11 wherein said visual availability indicator of said system comprises a display selected from the group consisting of color indicators, sounds, graphical displays, tables, highlighting, a change of text, underlining and brackets.

16. The system of claim 11 wherein a plurality of differing current availability status for said hyperlinks to the other web pages are simultaneously visually indicated on said first web page using a variety of differing visual availability indicators.

17. The system of claim 11 wherein the step of continually updating said ping table with said status codes indicating said current availability status for each of said hyperlinks comprises:

accessing said ping table having said hyperlinks to the other web pages referenced by relative numbers within said ping table;
 continually searching for and locating newer versions of said hyperlinks to the other web pages;
 replacing said hyperlinks to the other web pages with said newer versions of said hyperlinks; and
 identifying said newer versions of said hyperlinks as the currently found hyperlinks to the other web pages by renumbering said relative numbers within said ping table, thereby preventing duplicative hyperlink listings within said ping table.

18. The system of claim 17 further to perform the step of dynamically maintaining said hotlink search for a predetermined number of web pages away from said first web page.

19. The system of claim 17 wherein at least one of said newer versions of said hyperlinks to other web pages comprises a redirected web page.

20. A program storage device readable by a machine, tangibly embodying a program of instructions executable by the machine to perform method steps for a process of dynamically checking availability of hyperlinks on a web page comprising the steps of:

accessing a first web page having hyperlinks to other web pages;
 compiling a single ping transaction containing file structures for all said hyperlinks to other web pages;
 determining an availability status of all said hyperlinks to other web pages in a single request using said single ping transaction comprising the steps of,
  constructing a first single ping transaction containing an address to a common server and an individual file structure for each of a plurality of said hyperlinks to the other web pages accessible by said common server;
  sending said first single ping transaction to said common server to determine said availability status for each of said file structures of said hyperlinks; and
  receiving a return ping transaction containing each of said file structures and a status code indicating said availability status of each of said file structures of the hyperlinks; and
 visually indicating said availability status of the other web pages on said first web page comprising the steps of,
  creating a ping table containing said address to said common server and each of said individual file structures for each of said hyperlinks;
  storing said status codes indicating said availability status for each of said file structures of the hyperlinks in said ping table;
  continually updating said ping table with said status codes indicating a current availability status for each of said hyperlinks; and
  refreshing said first web page by dynamically indicating said current availability status for each of said hyperlinks to the other web pages using a visual availability indicator.

* * * * *